(12) United States Patent
Tang

(10) Patent No.: US 7,376,359 B2
(45) Date of Patent: May 20, 2008

(54) DIGITAL REGULATED LIGHT RECEIVE MODULE AND REGULATION METHOD

(75) Inventor: Zhenyu Tang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 552 days.

(21) Appl. No.: 10/506,888

(22) PCT Filed: Mar. 5, 2003

(86) PCT No.: PCT/CN03/00165

§ 371 (c)(1),
(2), (4) Date: Sep. 7, 2004

(87) PCT Pub. No.: WO03/077447

PCT Pub. Date: Sep. 18, 2003

(65) Prior Publication Data

US 2005/0129415 A1     Jun. 16, 2005

(30) Foreign Application Priority Data

Mar. 8, 2002 (CN) .................. 02 1 04081

(51) Int. Cl.
*H04B 10/06* (2006.01)
(52) U.S. Cl. .................. 398/202; 398/208; 398/209; 398/210; 398/211; 398/212; 398/213; 398/214; 398/33; 398/38; 398/135; 398/136; 398/25; 398/26; 398/27; 250/214 R; 250/214 AG; 250/214 LA; 250/214.1; 250/214 A; 250/214 SW; 327/514; 327/513; 356/73.1; 361/93.8; 361/94

(58) Field of Classification Search ................. 398/202, 398/206, 208, 209, 210, 212, 213, 214, 211, 398/135, 136, 25, 26, 27, 38, 33; 250/214 R, 250/214 SW, 214 A, 214 LA, 214 AG, 214.1; 327/514, 513; 361/93.8, 94; 356/73.1
See application file for complete search history.

(56) References Cited

U.S. PATENT DOCUMENTS

| 6,263,136 | B1 |   | 7/2001 | Jennings et al. |
| 6,313,459 | B1 | * | 11/2001 | Hoffe et al. ............. 250/214 R |
| 6,643,472 | B1 | * | 11/2003 | Sakamoto et al. .......... 398/202 |
| 7,155,133 | B2 | * | 12/2006 | Stewart et al. .............. 398/202 |

FOREIGN PATENT DOCUMENTS

| CN | 1292609 | 4/2001 |
| EP | 1096704 | 5/2001 |

* cited by examiner

*Primary Examiner*—Hanh Phan

(57) ABSTRACT

The invention discloses a digital adjusting method for an optical receiver module, and the method implements real-time monitor of parameters, on-line adjustment and non-linear compensation. The digital optical receiver module includes elements as follow: a voltage output circuit of optical power detection 24, a DC/DC voltage boost circuit 22 and a bias voltage adjusting unit which is consisted of an optical-electronic conversion circuit 21; a digital adjusting unit 25, an analog-digital converter (A/D converter) 26 and a memory 27. The digital adjusting unit 25 makes on-line adjustment and implements temperature compensation and dark current compensation of the optical receiver module. The A/D converter 26 monitors the optical power, the working temperature and the bias voltage of the optical detector in real time. The memory 27 stores parameters of the optical receiver module for comparison with a detected optical power and measured temperature etc. and for on-line interrogation.

17 Claims, 6 Drawing Sheets

--Prior Art--

--Prior Art--

--Prior Art--

DIGITAL REGULATED LIGHT RECEIVE MODULE AND REGULATION METHOD

FIELD OF THE TECHNOLOGY

The invention relates generally to an optical-electrical conversion technique in an optical network communication system, more specifically to an optical receiver module and a method for digitally adjusting its parameters.

BACKGROUND OF THE INVENTION

In an optical communication system, an optical receiver module converts optical signals into electronic signals, and its performance directly affects performance and stability of an optical communication system.

FIG. 1 shows a conventional analog optical receiver module with analog adjustment, which mainly includes three parts.

(1) An optical-electronic conversion circuit 11, which has an optical signal input and a weak electronic signal output, adopts a PIN-Photodiode detector or an Avalanche Photodiode detector (APD) or an optical detector; and a limiter amplifier (LIA) 13 amplifies the weak electronic signal limitedly to extract data and clock signal.

(2) A bias voltage adjusting circuit provides a bias voltage to the optical detector. Different APD need different bias voltage, and temperature compensation is also needed when an APD is working at different temperature, so the bias voltage should be adjustable. There are also a DC/DC voltage boost circuit 12, a sampling resistance RS, a regulation resistance RP2 of the DC/DC voltage circuit, a thermistor RT. In this diagram, the temperature compensation mode is analog.

FIG. 2 shows a typical and conventional bias voltage adjusting circuit diagram. With an integrated circuit (IC), the DC/DC voltage boost circuit is connected to a regulation resistance RP2 to regulate the voltage at point FB and finally to change the higher voltage V_APD (35~–75 V) through a feedback voltage Vfb in the IC.

FIG. 2 shows that V_APD=Vfb×R51÷RP2.

It is necessary to provide different temperature compensation i.e. different bias voltages, for different optical detectors working at different temperatures in order to obtain a higher receiving sensitivity; the compensation coefficient is about +0.08V/° C.~+0.15V/° C. In convention, a temperature transducer connected externally is used, and its output voltage regulates the feedback voltage Vfb to obtain different V_APD bias voltages; but during in use, it is impossible to track the bias voltage V_APD, namely it is unable to compensate fully different APD temperature characteristics. In order to have a better temperature compensation for each APD, what has been done presently is to adjust the potentiometer RP2 according to parameters of each APD and then to measure bias voltage V_APD with tools, such as a multimeter.

(3) Voltage output circuit of optical power detection 14 measures a bias current passing through the optical detector to detect received optical power, and the bias current is measured by the voltage in the sampling resistance RS.

FIG. 3 shows a conventional zero-adjustment circuit that provides a dark current compensation for a detected optical power. In this circuit, RS is a sampling resistance of the bias current; 31 is a PIN photodiode or APD; RP3 is a zero-adjustment resistance of the dark current; and the operational amplifier OP2 outputs an Optical Power Measurement voltage (OPM). Through the zero-adjustment resistance RP3, the output voltage of circuit 14 is adjusted to implement a zero-adjustment when there is no optical signal inputted, i.e. dark current zero-adjustment compensation.

At present, many optical receiver modules have a Loss Of Signal (LOS) upward reporting function, which is implemented by a hysteresis comparison circuit. Usually, comparing a peak-to-peak value of a sampling signal in the limiter amplifier chip or the measured output voltage of the optical power detecting circuit with a preset voltage, and when the receiving optical power sensitivity is lower than 3 dB, it is reported; the preset voltage might be set by a potentiometer, and it is fixed after setting.

As the optical receiver module mentioned above is mature technically, it is popularly used on the optical communication network. Nevertheless, adjustment of each parameters in this module is all implemented by potentiometers, and a potentiometer itself has disadvantages, such as low reliability, parameter drift caused by age etc.; besides, the parameters cannot be monitored and adjusted in real time and adjustment of parameters can only be done manually, which depends on skills of workers. In this way, production efficiency is low and non-linear compensation characteristic is bad.

In summary, the optical receiver module mentioned above has disadvantages as followings.

(1) Adjustment procedure of parameters is complicated and expensive, and maintainability of parameters online is bad.

Accuracy and stability of an optical receiver module with analog adjustment mainly depend on the accuracy and stability of a potentiometer, and a potentiometer changes its resistance value with mechanical contacts, so an optical detector working point is changed by the mechanical contacts of a potentiometer. Since a mechanical contact has problems of contact fault and bad temperature characteristic, also during transportation and vibration a mechanical contact will drift, so the parameters of an optical receiver module are drifted too.

Adjusting and testing a potentiometer is a complicated procedure, and this makes it difficult to put the optical receiver module production into automation, so it is difficult to reduce the production cost.

Adjusting and testing an optical receiver module highly depend on skill of a worker, so it is difficult to keep consistence of products.

Parameters of an optical receiver module with analog adjustment are difficult to reserve in a database which is set up with an IT platform, but this database is important for product maintenance and improvement.

Aging will cause drift of parameters, and in an optical receiver module with analog adjustment, it is impossible to make an online adjustment of the parameters without interrupting services, so the reliability and stability cannot well satisfy telecommunication equipment requirement.

(2) Parameters cannot be stored and sampled expediently, and the received optical power cannot be read out directly.

There is no any memory to store parameters, such as the initial bias voltage at adjustment, receiving sensitivity and the date of adjustment etc., so it is impossible to obtain those parameters online.

As to optical power detection, output voltage can be measured, but the received optical power cannot be read out directly.

(3) Nonlinear compensation is bad.

The temperature compensation mainly depends on a thermistor, and actual compensation is inconsistent with that of a ADP because of the thermistor temperature characteristic, so that key performances of the module such as receiving sensitivity get worse.

Optical power is measured through detecting response current of ADP and dark current alters with environment temperature so that precision of detection descends.

Along with development of digital technology, the analog optical receiver configuration should be replaced by a digital technique.

SUMMARY OF THE INVENTION

Objective of the invention is to provide a digital adjusting method for an optical receiver module. The method includes real-time monitoring parameters, on-line adjustment and non-linear compensation, and the compensation includes a temperature compensation and dark current compensation at different environment temperature through the bias voltage of the optical receiver module. In this method, a memory is also involved to store parameters of the optical receiver module, such as the type and production date etc.

The invention is implemented with the following scheme. An optical receiver module with digital adjustment includes an optical-electrical converter circuit and a bias voltage adjusting circuit that comprises a DC/DC voltage boost circuit; wherein the optical receiver module is standardized before applied;

a voltage output circuit of optical power detection detecting and sending an analog voltage of an optical power;

a digital adjusting unit digitally adjusting the DC/DC voltage boost circuit to output different voltage;

an A/D converter converting both an analog voltage of a measured working temperature of an optical detector into a digital data and the analog voltage of the optical power into a digital data, which are used for controlling the digital adjustment circuit, monitoring a bias voltage of an optical detector, making temperature compensation and dark current compensation at different temperature;

a memory storing parameters of the optical receiver module as a basis for adjustment.

Wherein the digital adjusting unit is a D/A converter.

Wherein the digital adjusting unit is a digital potentiometer.

An adjusting method for an optical receiver module with digital adjustment includes:

storing digital-analog (DA) values of a D/A converter of the optical receiver module during dark current zero-adjustment and optical detector bias voltage adjustment in a memory, wherein the storing is performed before the optical receiver module is applied and under the condition that no optical is inputted;

storing digital values (AD) converted through an A/D converter during standardizing optical power detection and temperature measurement before the optical receiver module is applied, wherein the AD value corresponds to optical power;

reading out the DA value during dark current zero-adjustment and optical detector bias voltage adjustment from the memory and loading to a digital adjusting unit;

comparing the optical power AD value stored in the memory during standardizing optical power detection with a detected optical power AD value converted by the A/D converter and sending a result to a CPU for linear interpolation;

comparing the temperature AD value stored in the memory during temperature measurement with a measured temperature AD value converted by the A/D converter, and sending a result to the CPU;

the CPU detecting whether dark current compensation at current temperature satisfies preset temperature compensation requirement, if it is, keeping the DA value, otherwise changing the DA value read out to adjust further dark current compensation;

the CPU detecting whether the bias voltage of the optical detector at current temperature satisfies preset temperature compensation requirement, if it is, keeping said DA value, otherwise changing the DA value read out to adjust further voltage of the optical detector.

Storing DA values during dark current zero-adjustment comprises:

setting a DA value;

converting an analog output Optical Power Measurement (OPM) of an operation amplifier for optical power detection into a digital data by the A/D converter, and then sending to the CPU;

the CPU detecting whether the digital data satisfies dark current zero-adjustment requirement; if it is, storing the set DA value in the memory, otherwise returning to setting a DA value.

Storing DA values during optical detector bias voltage adjustment comprises:

setting a DA value;

converting an optical detector bias voltage by the A/D converter into a digital data, and then sending to the CPU;

the CPU detecting whether or not the digital data satisfies the optical detector bias voltage requirement; if it is, storing the set DA value in the memory, otherwise, returning to setting a DA value.

Storing AD values during standardizing optical power detection comprises:

inputting a standard light source;

determining corresponding AD values with 0.5 dB optical power space within optical power detection scope, and storing the determined AD values in the memory.

Storing AD values during standardizing temperature measurement comprises:

calculating corresponding relationship between a temperature and the AD value;

determining corresponding AD values with 5° C. space within a certain temperature scope, storing the determined AD values in the memory.

The method further comprises storing, in the memory, parameters of an optical receiver module including type of the optical receiver module, production date, receiving sensitivity, overload point and maximum bias voltage of the optical detector during test.

The method further comprises, reading out a digital data of bias voltage of the optical detector converted by an A/D converter through the CPU, and then real-timely displaying.

An apparatus for optical power detection in an optical receiver module, which is standardized before applied, includes:

a voltage output circuit of optical power detection sampling a bias current, converting the bias current to a voltage for indicating optical power, and sending the voltage which is analog;

an A/D converter receiving the analog voltage, converting the analog voltage into digital data of the analog voltage, and comparing the digital data of the analog voltage with an AD value stored in a memory, and sending a result to a CPU for obtaining the optical power; and the memory storing an AD value of an analog voltage, and optical power corresponding to the AD value when the optical power of the apparatus is standardized.

A method for optical power detection in an optical receiver module includes:

sampling, by a voltage output circuit of optical power detection, a bias current, converting the bias current to a voltage for indicating an optical power, and sending the voltage which is analog; wherein the optical power of the optical power detection module is standardized before applied;

receiving, by an A/D converter, the analog voltage, converting the analog voltage into digital data of the analog voltage, and comparing the digital data of the analog voltage with an AD value stored in a memory, and sending a result to a CPU for obtaining the optical power; and storing, by the memory, an AD value of an analog voltage, and optical power corresponding to the AD value when the optical power of the optical power detection module is standardized.

Comparing with the conventional optical receiver module with analog adjustment, the optical receiver module with digital adjustment of the invention mainly changes the adjustment mode: replacing a conventional potentiometer with a memory, a digital adjusting unit and an A/D converter. In this way, an optical receiver module can be tested online and adjusted in real-time.

The invention applies a digital potentiometer or a D/A converter to implement online adjustment of an optical receiver module, and the invention also applies an A/D converter to monitor a detected optical power, a working temperature and bias voltage of an APD.

The invention applies a memory to store parameters of an optical receiver module, so the parameters might be interrogated online.

The invention applies a memory and A/D converter to determine a detected optical power.

The invention applies digital technique to implement dark current compensation and temperature compensation.

To implement the invention, software is needed, so the system has a software overhead comparing with an optical receiver module having analog adjustment, but it has the following advantages.

(1) Better stability and reliability. Since a digital adjusting unit—(a digital potentiometer or a D/A converter) does not have mechanical contacts, it is more reliable, stable and with longer life.

(2) Easier to test and lower production cost. Since a digital adjusting unit is adjusted by software, it is easier to test and adjust the bias voltage of an optical detector.

(3) Easier to trace products. Since parameters of an optical receiver module are stored in a memory, a product data is easier to store in a database and to trace.

(4) An optical receiver module is monitored on-line, so the maintenance cost is reduced.

(5) It is more effective that the dark current compensation and temperature compensation of an optical receiver module, its receiving sensitivity and detecting accuracy are raised.

EMBODIMENTS OF THE INVENTION

The invention will be described in more detail with reference to drawings.

Figure 1:
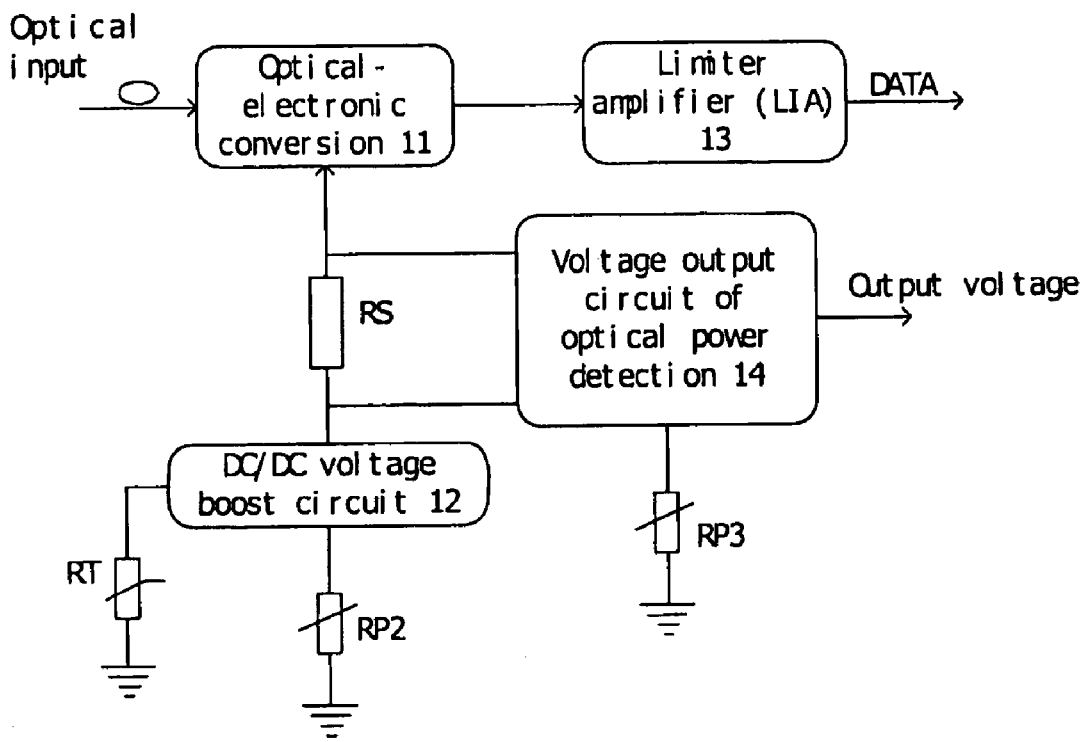
FIG. 1 shows a diagram of a conventional optical receiver module with analog adjustment.
Figure 2:
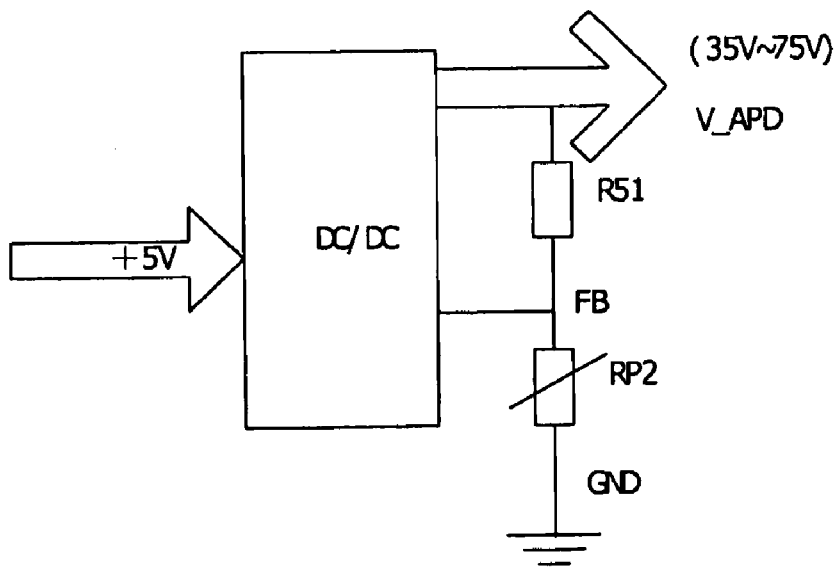
FIG. 2 shows a diagram of a bias voltage boost circuit of a conventional optical receiver module with analog adjustment.
Figure 3:
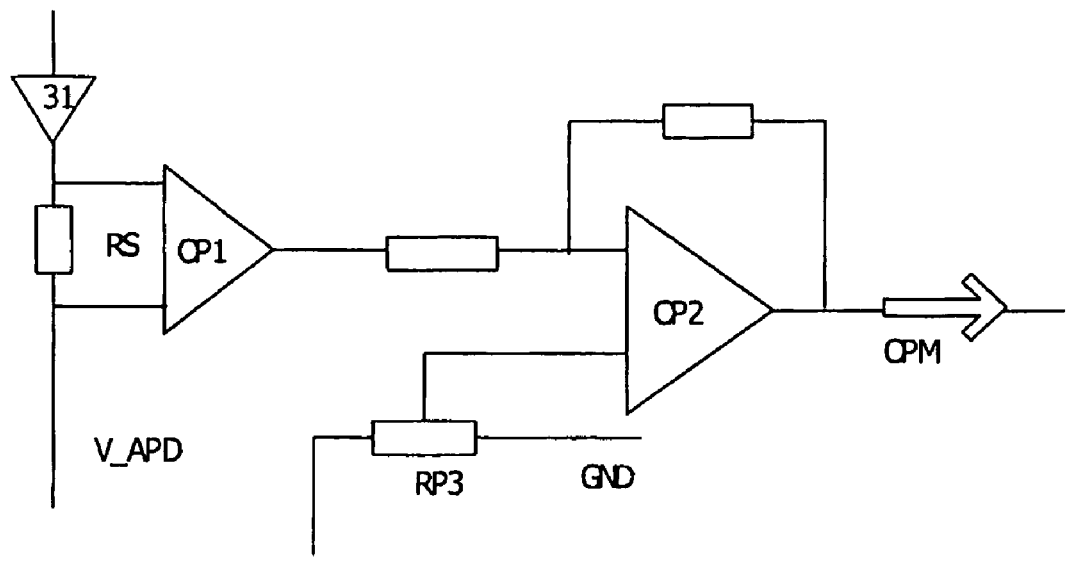
FIG. 3 shows a diagram of a dark current compensation circuit of a conventional optical receiver module with analog adjustment.
Figure 4:
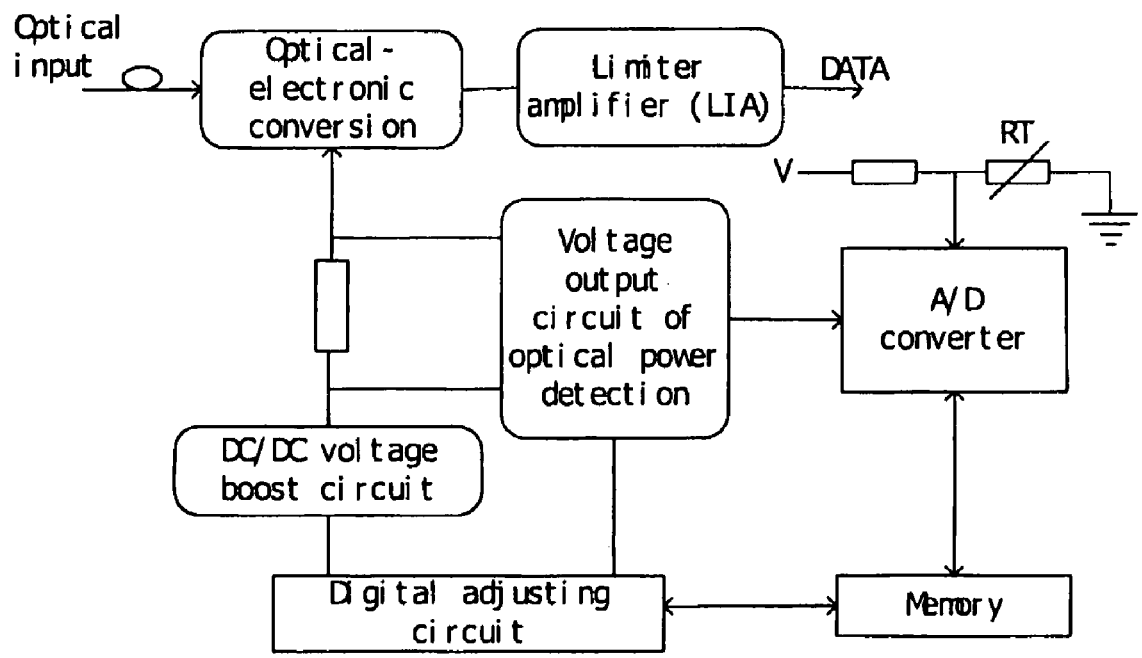
FIG. 4 shows a diagram of an optical receiver module with digital adjustment of the invention.

FIG. 4 shows a diagram of a digital optical receiver module. The digital optical receiver module includes elements as follow: an optical-electronic conversion circuit 21, a DC/DC voltage boost circuit 22, a limiter amplifier 23 (LIA), a voltage output circuit of optical power detection 24, a digital adjusting circuit 25, an analog-digital converter (A/D or ADC) 26 and a memory 27. Comparing with the analog optical receiver module, shown in FIG. 1, a digital adjusting circuit 25, an A/D converter 26 and a memory 27 are added in the digital optical receiver module. A thermistor RT measures the optical detector temperature for compensation through the bias voltage.

The optical-electronic conversion circuit 21 converses a received optical signal into an electrical signal that is amplified by the limiter amplifier 23 and outputted, as shown with DATA in FIG. 4. The A/D converter 26 converts the OPM voltage and the voltage of the thermistor RT into digital data. By interrogating appropriate addresses, based on said data, in the memory 27, the APD working temperature and corresponding bias voltage data are obtained; and then through the digital adjusting circuit (a D/A converter), an analog voltage that adjusts the DC/DC voltage boost circuit 22 is produced. Said analog voltage adjusts the optical detector bias voltage and compensates the dark current of the optical detector. On the other hand, the sampling resistance RS which connects with voltage output circuit of optical power detection 24 and a DC/DC voltage boost circuit 22 may be made with temperature compensation.

In order to avoid disadvantages of the analog potentiometer, in this invention parameter adjustment deploys a digital mode. There are two ways to implement parameter adjustment digitally: a D/A converter (DAC) adjustment mode, as shown in FIG. 5, or a digital potentiometer adjustment mode, as shown in FIG. 6.

Figure 5:
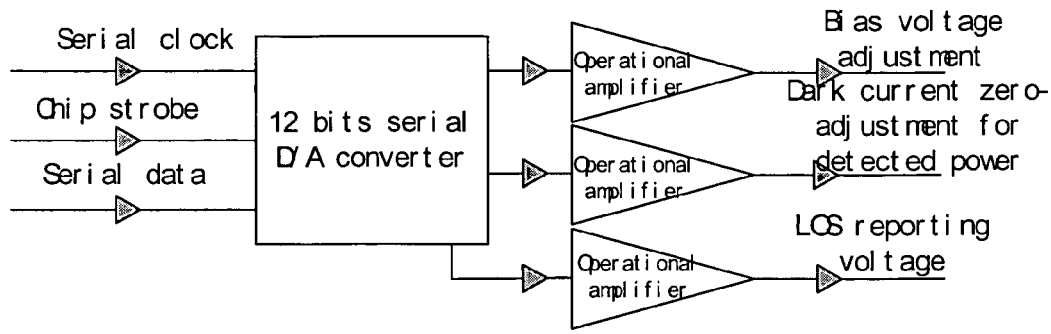
FIG. 5 shows a diagram of a D/A converter control mode in an optical receiver module with digital adjustment of the invention.
Figure 6:
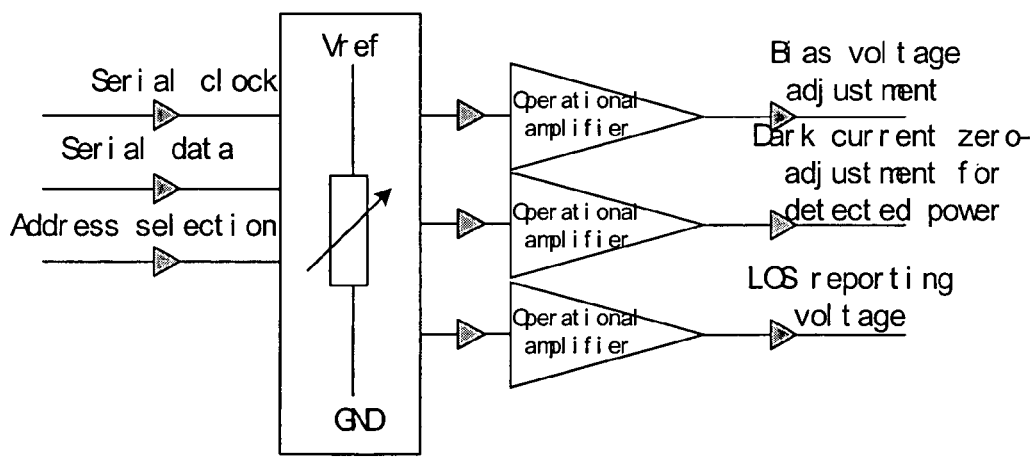
FIG. 6 shows a diagram of a digital potentiometer control mode in an optical receiver module with digital adjustment of the invention.

FIG. 5 shows a D/A converter adjustment mode that implements the following functions: bias voltage adjustment, dark current zero-adjustment and LOS reporting upward.

In FIG. 5, there are a D/A converter and three operational amplifiers. Input signals of the D/A converter are: a serial clock, a chip strobe and a serial data that are inputted to a serial interface. Output signals of the D/A converter are connected to inputs of the three operational amplifiers, respectively, to make level conversion, and outputs of the three operational amplifiers provide respectively: a bias voltage adjustment signal, a dark current zero-adjustment signal and a LOS upward reporting signal.

An output voltage of a D/A converter satisfies the following formula:

$$V_o = \frac{V_{REF} \times \text{Data}}{2^N}$$

Wherein $V_O$ is the analog output voltage, $V_{REF}$ is the reference of the D/A converter, Data is the digital input of the D/A converter and N is the bits of the D/A converter.

FIG. 6 shows a digital potentiometer adjustment mode that implements the following functions: bias voltage adjustment, dark current zero-adjustment and LOS reporting upward. Digital potentiometer 61 has 64 levels, three serial inputs: a serial clock, a data and an address selection signal, and three outputs. The three outputs of the digital potentiometer are connected to the inputs of the three operational amplifiers that make level conversion, and outputs of the three operational amplifiers provide: a bias voltage adjustment signal, a dark current zero-adjustment signal and a LOS reporting signal, respectively.

Figure 7:
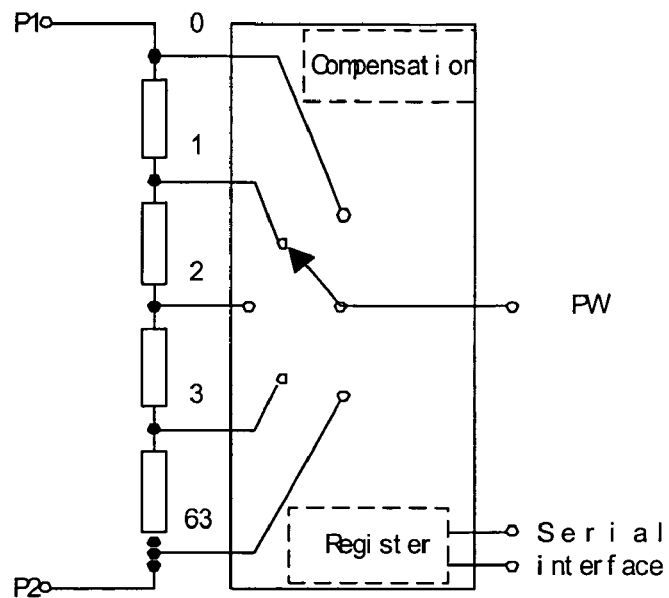
FIG. 7 shows a digital potentiometer diagram in FIG. 6.

FIG. 7 shows a diagram of a digital potentiometer, and from the function point of view the digital potentiometer is consisted of a resistance array and a multi-channel section analog switch. The 64 levels resistance array is consisted of 63 resistances, 1, 2, . . . 63 that are serially connected and acts as a voltage divider between points P1 and P2. Depending on different data in the register, the multi-channel section analog switch selects different point to be connected to the output PW, and this is similar to the contact movement of a mechanical potentiometer.

In FIGS. 5 and 6, there are three operational amplifiers. The function of them is to make level conversion and impedance isolation. The output voltage scope of a DAC or a digital potentiometer is from 0 to Vref, but each optical receiver module has different adjustment voltage scope. Therefore, it is necessary to have an operational amplifier to make level conversion. Furthermore, the output impedance of a DAC or a digital potentiometer is larger, so their load capacity is lower, and the operational amplifier makes impedance isolation between output of the DAC or digital potentiometer and the adjusted circuit.

Figure 8:
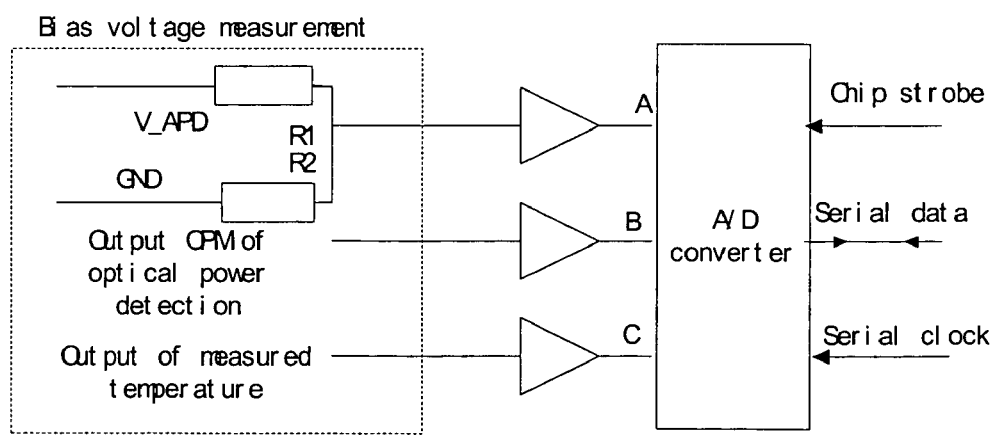
FIG. 8 shows a detected analog output diagram in an optical receiver module with digital adjustment of the invention.

FIG. 8 shows a diagram implementing optical power detection in digital and online mode. In this diagram, an ADC converts a detected analog value into a digital data, and the detected analog values include the bias voltage V_APD, the output voltage OPM of the detected optical power and the output voltage of the measured temperature. The output of the ADC is a serial data. In this manner, test efficiency of the module is improved because monitor can be implemented without using a multimeter.

Taking a 12 bits ADC as an example, the output data satisfies the following formula:

$$\text{Data} = \frac{V_{in}}{V_{REF}} \times 2^N;$$

Wherein $V_{in}$ is an analog input voltage, $V_{REF}$ is a reference voltage, N is bits of the ADC and Data is output data of the ADC.

In order to increase detection accuracy, an optical power is detected in a standardization way that stores ADC output data of a standard optical power every 0.5 dB within the detection scope in the memory.

There is a two-dimension table (see below) in the memory that includes a corresponding relationship between an ADC output data and a temperature value which is obtained through calculation based on the ADC output data. The reported temperature value is obtained through an interpolation with the two-dimension table and voltage of the thermistor RT measured directly.

In the optical receiver module of the invention there is a memory 27 (refer to FIG. 4). With this memory, historical data, such as: type of the optical receiver module, the date of production, the sensitivity, overload point and maximum bias voltage etc. at factory during test, are stored, so the remote interrogation of the historical data are possible. As to the optical power detection, some key optical powers are determined as a standard so that practical optical powers can be obtained accurately through comparing the data sampled by the ADC with the determined standard optical powers. Furthermore, initial adjustment parameter of modules can be stored in the memory.

In the below table, if a detected parameter corresponds to a working temperature of optical detector, the practical temperature and digital data of the detected parameter are determined, and the detected parameter is obtained through a temperature compensation formula in case of a temperature transducer such as a thermistor; if a detected parameter corresponds to a V-ADP voltage, the practical V-ADP voltage and its digital data are determined; if a detected parameter corresponds to an optical power, the practical optical power and digital data of the detected parameter are determined.

During optical power detection, the V_APD value is calculated by the following formula:

$$\text{Data} = \frac{V_{in}}{V_{REF}} \times 2^N;$$

Wherein $V_{REF}$=5V, N=12, Data=23H and V_APD=15 $V_{in}$ case of V_APD the voltage sampled one-fifteenth $V_{in-}$.

At different temperature, an optical detector must make temperature compensation through the bias voltage so that higher receiving sensitivity can be obtained.

| Measured Item | Determined standard A/D output data | Practical Value |
|---|---|---|
| Temperature | 612H | −5° C. |
|  | 51EH | 0° C. |
|  | 4ABH | 5° C. |
|  | ... | ... |
|  | 21CH | 55° C. |
| V_APD Voltage | 6E3H | $6E3H \times \frac{5}{2^{12}} \times 15 = 32.28V$ |
| Optical Power | 008H | −32.0 dBm |
|  | 01DH | −31.5 dBm |
|  | 013H | −30.0 dBm |
|  | 019H | −29.0 dBm |

-continued

| Measured Item | Determined standard A/D output data | Practical Value |
|---|---|---|
| | 01EH | −28.0 dBm |
| | 025H | −27.0 dBm |
| | ... | ... |
| | 6EAH | −9.0 dBm |

In a conventional analog adjustment of an optical receiver module, only analog compensation in temperature is made; in this case the temperature compensation curve is not consistent with the real APD temperature curve. In this invention, an A/D converter is used to sample the working temperature of an APD in real-time, and after calculation a digital adjusting unit is used to adjust finely the bias voltage of an optical detector, so the temperature compensation is more accurate. Furthermore, working temperature of the APD can be monitored and interrogated online. At the same time, by means of the temperature sampled real-timely by the A/D converter, the dark current compensation at different temperature is made digitally by the D/A converter, so accuracy of detected optical power is raised.

Figure 9:
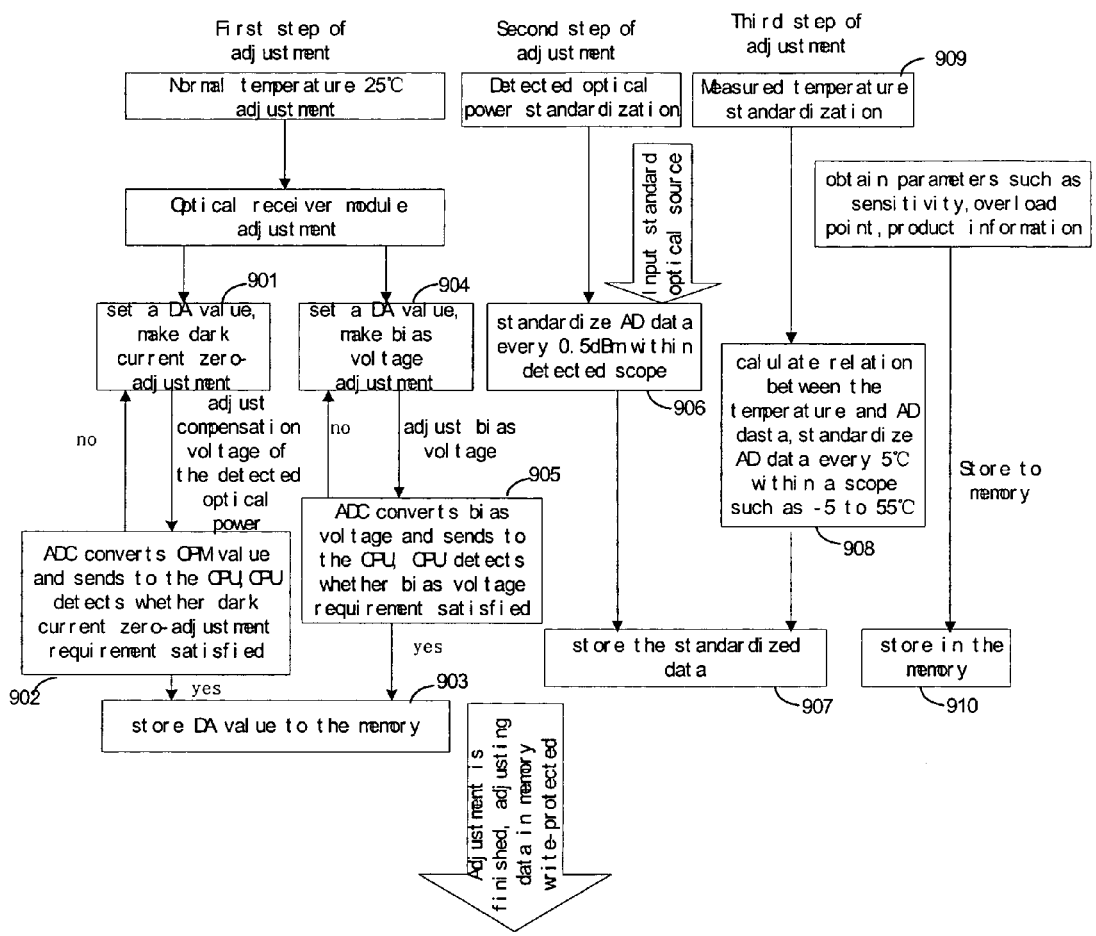
FIG. 9 shows an adjustment procedure of an optical receiver module of the invention.

FIG. 9 shows an adjustment procedure of an optical receiver module and write into the memory of the invention. The procedure has three parts: first part is the optical receiver module adjusted at 25° C. normal environment temperature, second part is the detected optical power standardization, and third part is the measured temperature determination.

In first part, there are two branches: one is the dark current zero-adjustment; another is the bias voltage adjustment.

The dark current zero-adjustment includes the following steps:

Step 901, set a digital value i.e. DA value in the DAC, and start to make dark current zero-adjustment of the optical receiver module;

Step 902, at said DA value, the OPM value is converted at the ADC, and output data of the ADC is sent to the CPU; the CPU determines whether the data satisfies the dark current zero-adjustment requirement; if it does not satisfy, return to Step 901 to set a new DA value and repeat again; if it satisfies, go to Step 903.

The bias voltage adjustment includes the following steps.

Step 904, set a DA value in the DAC, and start to make bias voltage adjustment;

Step 905, at said DAC value, the bias voltage V_APD is converted at the ADC, and data of the ADC is sent to the CPU; the CPU determines whether the data satisfies the bias voltage requirement of the optical detector; if it does not satisfy, return to Step 904 to have a new DA value and repeat again; if it satisfies, go to Step 903.

Step 903, store the satisfied data in the memory.

Second part standardizes the detected optical power and includes the following steps:

Step 906, input a standard light source, determine ADC output data every 0.5 dB within the detected scope;

Step 907, store every determined optical power data in the memory.

Third part standardizes the working temperature of the optical detector and includes the following steps.

Step 908, a temperature transducer measures environment temperature, and determine the ADC output data every 5° C. within a scope, such as −5 to 55° C., and calculate the temperature value corresponding to the ADC output data;

Step 907, store every determined ADC output data and its corresponding temperature in the memory.

Besides, some inspection data at the factory, receiving sensitivity and overload point of the optical receiver module, may be stored in the memory (Steps 909 and 910).

After the adjustment procedure is finished, the data stored above are in a write-protection state.

Figure 10:
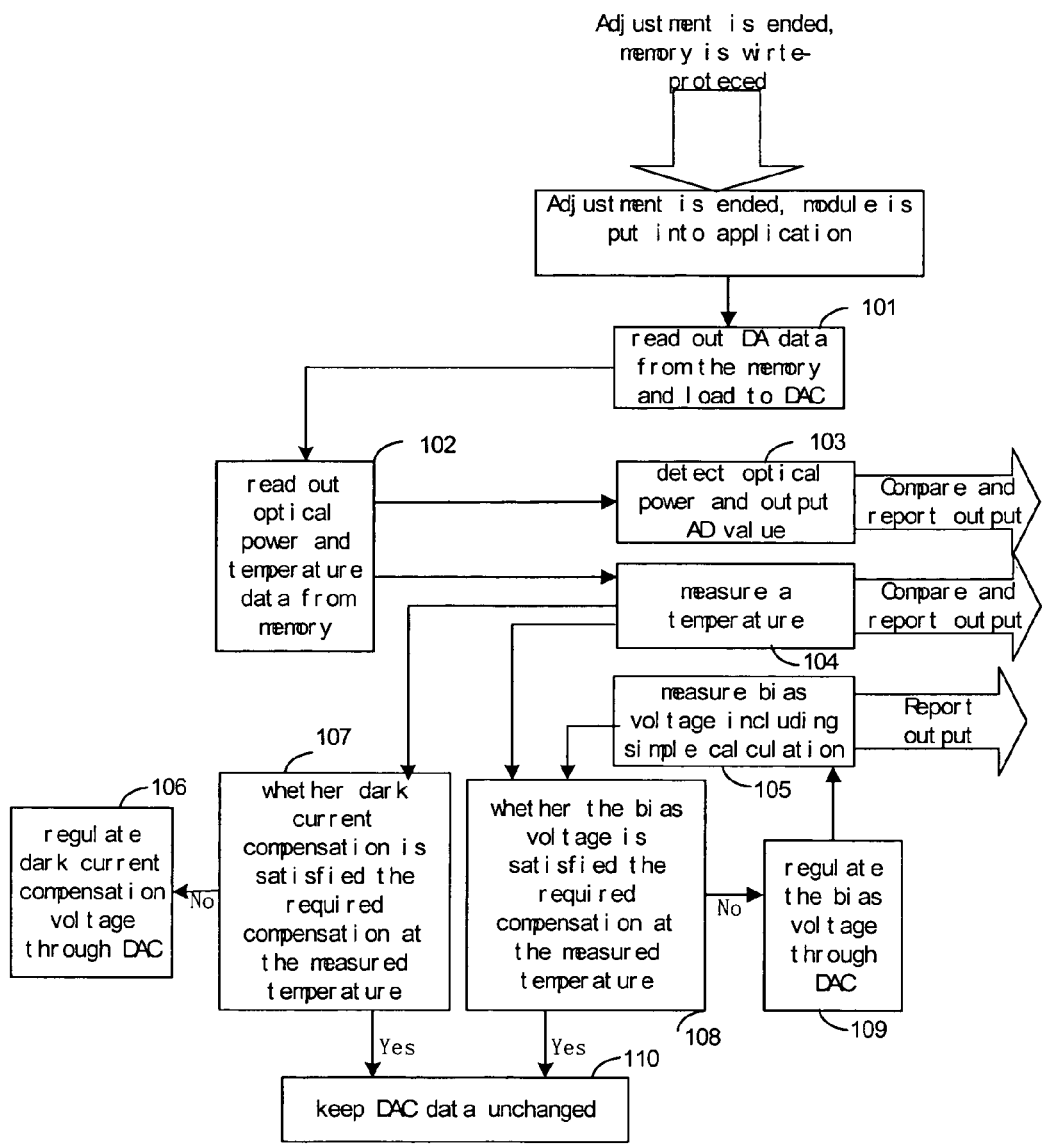
FIG. 10 shows a working procedure of an optical receiver module of the invention.

FIG. 10 shows working procedure of the optical receiver module after being adjusted that includes the following steps:

Step 101, read out DA data for an initial parameter from the memory and load the data to the DAC, Step 102; read out an optical power data and a determined ADC output temperature data from the memory, Step 103; compare the detected optical power data with the stored optical power read out at Step 102, and report the result to the CPU, Step 104; compare the measured temperature data with the stored temperature data read out at Step 102, and report the result to the CPU, Step 107; according to the obtained temperature value at Step 104, determine whether the dark current compensation is satisfied the required compensation at the obtained temperature value, Step 106; if the compared result at Step 107 does not satisfy requirement, regulate the dark current compensation voltage through DA data, Step 110; if the compared result at Step 107 satisfies requirement, keep the DA data unchanged, Step 108; according to the obtained temperature value at Step 104, determine whether the bias voltage satisfies the required compensation at the obtained temperature value, Step 109; if the compared result at Step 108 does not satisfy requirement, regulate the bias voltage through DA data and return to Step 105, Step 110; if the compared result at Step 108 satisfies requirement, keep the DA data unchanged, Step 105; calculate the regulated bias voltage at Step 109 by the formula and report to CPU.

In a conventional optical receiver module, only analog compensation in temperature is made, so the temperature compensation is not complete, i.e. the temperature compensation curve does not coincide with the APD temperature curve; in this case, receiving sensitivity will be degraded at higher and lower temperature environment. The invention samples the environment temperature with an ADC, and after calculation, the bias voltage is finely regulated through the digital adjusting unit to make the temperature compensation. So, the temperature compensation is more accurate, and at the same time, the APD working temperature will be monitored and interrogated on-line.

Similarly, using an ADC to sample the APD working temperature makes digital compensation of a dark current possible, and this is a simple and effective way to increase the optical power detection accuracy.

Adjustment and monitor online can be implemented with the optical receiver module of the invention in terms of digital adjustment, which brings out excellent performance for the optical receiver module with the scheme.

An optical receiver module and its regulating method have been tested in some optical communication network products, and it has been proved that it is reliable and feasible.

The invention claimed is:

1. An optical receiver module with digital adjustment, comprising: an optical-electrical converter circuit and a bias voltage adjusting circuit that comprises a DC/DC voltage boost circuit; wherein the optical receiver module is standardized before applied;

a voltage output circuit of optical power detection detecting and sending an analog voltage of an optical power;

a digital adjusting unit digitally adjusting the DC/DC voltage boost circuit to output different voltage;

an A/D converter converting both an analog voltage of a measured working temperature of an optical detector into a digital data and the analog voltage of the optical power into a digital data, which are used for controlling the digital adjustment circuit, monitoring a bias voltage of the optical detector, making temperature compensation and dark current compensation at different temperature; and a memory storing parameters of the optical receiver module as a basis for adjustment.

2. The optical receiver module with digital adjustment according to claim 1, wherein the digital adjusting unit is a D/A converter.

3. The optical receiver module with digital adjustment according to claim 1, wherein the digital adjusting unit is a digital potentiometer.

4. An adjusting method for an optical receiver module with digital adjustment, comprising, storing digital-analog (DA) values of a D/A converter of the optical receiver module during dark current zero-adjustment and optical detector bias voltage adjustment in a memory, wherein the storing is performed before the optical receiver module is applied and under the condition that no optical is inputted;

storing digital values (AD) converted through an A/D converter during standardizing optical power detection and temperature measurement before the optical receiver module is applied, wherein the AD value corresponds to optical power;

reading out the DA value during dark current zero-adjustment and optical detector bias voltage adjustment from the memory and loading to a digital adjusting unit;

comparing the optical power AD value stored in the memory during standardizing optical power detection with a detected optical power AD value converted by the A/D converter and sending a result to a CPU in the optical receiver module for linear interpolation;

comparing the temperature AD value stored in the memory during temperature measurement with a measured temperature AD value converted by the A/D converter, and sending a result to the CPU;

the CPU detecting whether dark current compensation at current temperature satisfies preset temperature compensation requirement, if it is, keeping the DA value, otherwise changing the DA value read out to adjust further dark current compensation;

the CPU detecting whether the bias voltage of the optical detector at current temperature satisfies preset temperature compensation requirement, if it is, keeping said DA value, otherwise changing the DA value read out to adjust further voltage of the optical detector.

5. The method according to claim 4, wherein storing DA values during dark current zero-adjustment comprises:

setting a DA value;

converting an analog output Optical Power Measurement (OPM) of an operation amplifier for optical power detection into a digital data by the A/D converter, and then sending to the CPU;

the CPU detecting whether the digital data satisfies dark current zero-adjustment requirement; if it is, storing the set DA value in the memory, otherwise returning to setting a DA value.

6. The method according to claim 4, wherein storing DA values during optical detector bias voltage adjustment comprises:

setting a DA value;

converting an optical detector bias voltage by the A/D converter into a digital data, and then sending to the CPU;

the CPU detecting whether the digital data satisfies the optical detector bias voltage requirement; if it is, storing the set DA value in the memory, otherwise, returning to setting a DA value.

7. The method according to claim 4, wherein storing AD values during standardizing optical power detection comprises:

inputting a standard light source;

determining corresponding AD values with 0.5 dB optical power space within optical power detection scope, and storing the determined AD values in the memory.

8. The method according to claim 4, wherein storing AD values during standardizing temperature measurement comprises:

calculating corresponding relationship between a temperature and the AD value;

determining corresponding AD values with 5° C. space within a certain temperature scope, storing the determined AD values in the memory.

9. The method according to claim 4, further comprises, storing, in the memory, parameters of the optical receiver module including type of the optical receiver module, production date, receiving sensitivity, overload point and maximum bias voltage of the optical detector during test.

10. The method according to claim 4, further comprising: reading out a digital data of bias voltage of the optical detector converted by an A/D converter through the CPU, and then real-timely displaying.

11. An apparatus for optical power detection in an optical receiver module, which is standardized before applied, comprising:

a voltage output circuit of optical power detection sampling a bias current, converting the bias current to a voltage for indicating optical power, and sending the voltage which is analog;

an A/D converter receiving the analog voltage, converting the analog voltage into digital data of the analog voltage, and comparing the digital data of the analog voltage with an AD value stored in a memory, and sending a result to a CPU for obtaining the optical power; and the memory storing an AD value of an analog voltage, and optical power corresponding to the AD value when the optical power of the apparatus is standardized.

12. The apparatus according to claim 11, wherein the optical power of the optical power detection module is standardized through:

inputting a standard light source;

determining corresponding AD values with 0.5 dB optical power space within optical power detection scope, and storing the determined AD values and corresponding optical power in the memory.

13. The apparatus according to claim 11, wherein dark current zero-adjustment is further carried out for the apparatus, and the dark current zero-adjustment comprises:

setting a DA value;

the CPU detecting whether dark current compensation at current temperature satisfies preset temperature compensation requirement, if it is, keeping the DA value, otherwise changing the DA value to adjust further dark current compensation.

14. A method for optical power detection in an optical receiver module, comprising:

sampling, by a voltage output circuit of optical power detection, a bias current, converting the bias current to a voltage for indicating an optical power, and sending the voltage which is analog; wherein the optical power of the optical power detection module is standardized before applied;

receiving, by an A/D converter, the analog voltage, converting the analog voltage into digital data of the analog voltage, and comparing the digital data of the analog voltage with an AD value stored in a memory, and sending a result to a CPU for obtaining the optical power; and storing, by the memory, an AD value of an analog voltage, and optical power corresponding to the AD value when the optical power of the optical power detection module is standardized.

15. The method according to claim 14, wherein the optical power of the optical power detection module is standardized through:

inputting a standard light source;

determining corresponding AD values with 0.5 dB optical power space within optical power detection scope, and storing the determined AD values and corresponding optical power in the memory.

16. The method according to claim 14, further comprising: carrying out dark current zero-adjustment through:

setting a DA value;

detecting, by the CPU, whether dark current compensation at current temperature satisfies preset temperature compensation requirement, if it is, keeping the DA value, otherwise changing the DA value to adjust further dark current compensation.

17. The method according to claim 14, wherein the CPU obtains the optical power through linear interpolation.

* * * * *